United States Patent
Shih

(10) Patent No.: US 8,289,906 B2
(45) Date of Patent: Oct. 16, 2012

(54) METHOD AND SYSTEM FOR ASSIGNING SERVERS BASED ON SERVER STATUS IN A WIRELESS NETWORK

(75) Inventor: Jerry Shih, Austin, TX (US)

(73) Assignee: Samsung Electronics Co. Ltd., Suwon-si (KR)

( * ) Notice: Subject to any disclaimer, the term of this patent is extended or adjusted under 35 U.S.C. 154(b) by 1143 days.

(21) Appl. No.: 10/811,005

(22) Filed: Mar. 26, 2004

(65) Prior Publication Data

US 2005/0213589 A1    Sep. 29, 2005

(51) Int. Cl.
    *H04W 4/00*    (2009.01)
(52) U.S. Cl. .............. 370/329; 370/338; 455/422.1; 455/438
(58) Field of Classification Search ............ 370/329, 370/335, 338, 398; 455/422.1, 438
See application file for complete search history.

(56) References Cited

U.S. PATENT DOCUMENTS

| | | | |
|---|---|---|---|
| 5,617,540 A * | 4/1997 | Civanlar et al. ....... 370/395.54 |
| 6,243,367 B1 * | 6/2001 | Hussain ................... 370/329 |
| 6,353,599 B1 * | 3/2002 | Bi et al. ................... 370/328 |
| 6,445,924 B1 * | 9/2002 | Rasanen .................. 455/437 |
| 6,968,192 B2 * | 11/2005 | Longoni .................. 455/453 |
| 7,664,514 B2 * | 2/2010 | Morishima et al. ...... 455/456.3 |
| 7,730,165 B2 * | 6/2010 | Shapiro ................... 709/220 |
| 2001/0054063 A1 * | 12/2001 | Motoyama et al. ...... 709/203 |
| 2003/0210694 A1 * | 11/2003 | Jayaraman et al. ...... 370/392 |
| 2004/0008679 A1 * | 1/2004 | Sinnarajah et al. ...... 370/390 |
| 2004/0022212 A1 * | 2/2004 | Chowdhury et al. ..... 370/329 |
| 2004/0033816 A1 * | 2/2004 | Semper et al. ........... 455/561 |
| 2004/0037314 A1 * | 2/2004 | Spear ....................... 370/466 |
| 2004/0041844 A1 * | 3/2004 | Grooms ................... 345/823 |
| 2006/0184667 A1 * | 8/2006 | Clubb et al. ............. 709/224 |
| 2006/0200540 A1 * | 9/2006 | Morishima et al. ...... 709/220 |
| 2009/0094362 A1 * | 4/2009 | Huff ......................... 709/224 |

\* cited by examiner

*Primary Examiner* — Ayaz Sheikh
*Assistant Examiner* — Mounir Moutaouakil

(57) ABSTRACT

An interrogating state machine for use in a wireless network comprising a plurality of wireless communication devices is provided that includes a server status store and a server assigner. The server status store is operable to store server status information for each of a plurality of servers. The server assigner is operable to collect server status information from the servers, to store the server status information in the server status store, and to assign one of the servers to host one of the wireless communication devices.

20 Claims, 4 Drawing Sheets

METHOD AND SYSTEM FOR ASSIGNING SERVERS BASED ON SERVER STATUS IN A WIRELESS NETWORK

TECHNICAL FIELD OF THE INVENTION

The present invention relates generally to wireless networks and, more specifically, to a method and system for assigning servers based on server status in a wireless network.

BACKGROUND OF THE INVENTION

Current wireless communication standards support Internet Protocol Multimedia Domain (IPMMD) that converges IP and telecom services. The wireless IPMMD has opened up a whole new market segment for wireless network operators and service providers. The IPMMD provides a control environment to a wireless network operator to offer countless enriched Internet services to its customers, thereby allowing the operator to break into a fast-growing market segment and increasing operation revenues.

In order for a wireless user to receive these IPMMD services, the user has to register in the IPMMD registrar serving call state control function (S-CSCF) that is a SIP proxy server. According to current standards, a home interrogating CSCF (I-CSCF), which is another SIP proxy server, has to allocate an S-CSCF in the home network domain as a registrar for that user to register and receive IPMMD services.

Conventional methods for assigning a user to an S-CSCF for registration include random selection and round robin. With random selection, the I-CSCF simply randomly assigns users to an S-CSCF. With round robin, the I-CSCF assigns users to an S-CSCF based on the number of other users assigned. Thus, for example, for a system having only two S-CSCFs, the I-CSCF may assign a first user to the first S-CSCF, a second user to the second S-CSCF, a third user to the first S-CSCF, and so on. However, even if the I-CSCF keeps track of how many users are assigned to each S-CSCF at any one time, neither this method nor the random selection method are able to provide a balanced load for the system based on the actual loads of the S-CSCFs in the system. The S-CSCFs are assigned either randomly or simply based on the number of registered users.

SUMMARY OF THE INVENTION

In accordance with the present invention, a method and system for assigning servers based on server status in a wireless network are provided that substantially eliminate or reduce disadvantages and problems associated with conventional systems and methods.

According to one embodiment of the present invention, an interrogating state machine for use in a wireless network having a plurality of wireless communication devices is provided that includes a server status store and a server assigner. The server status store is operable to store server status information for each of a plurality of servers. The server assigner is operable to collect server status information from the servers, to store the server status information in the server status store, and to assign one of the servers to host one of the wireless communication devices.

According to another embodiment of the present invention, a wireless network is provided that includes a plurality of servers and at least one interrogating state machine. Each server has a varying server status, and the server statuses of the servers collectively form a varying system status. The interrogating state machine is operable to receive a registration request from one of a plurality of wireless communication devices and, based on the registration request, to assign one of the servers to host the wireless communication device based on a current system status. The current system status is based on the varying system status.

According to yet another embodiment of the present invention, a method for assigning one of a plurality of servers to host a registration for a wireless communication device is provided. The method includes receiving a registration request from the wireless communication device and assigning one of the servers to host the wireless communication device based on server statuses of the servers.

Technical advantages of one or more embodiments of the present invention include providing an improved method for assigning servers in a wireless network. In a particular embodiment, a server is assigned based on the current server status of each of the servers. The server statuses may be based on actual load, capability and/or other factors related to the ability of the servers to handle incoming registration requests. As a result, a server may be assigned based on its actual ability to handle a request. Accordingly, the system load may be more evenly balanced, thereby maximizing network usage effectiveness. In addition, using this method, a server may be easily isolated for administrative, maintenance and/or other suitable reasons without impacting the operation of the wireless network.

Other technical advantages will be readily apparent to one skilled in the art from the following figures, description, and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
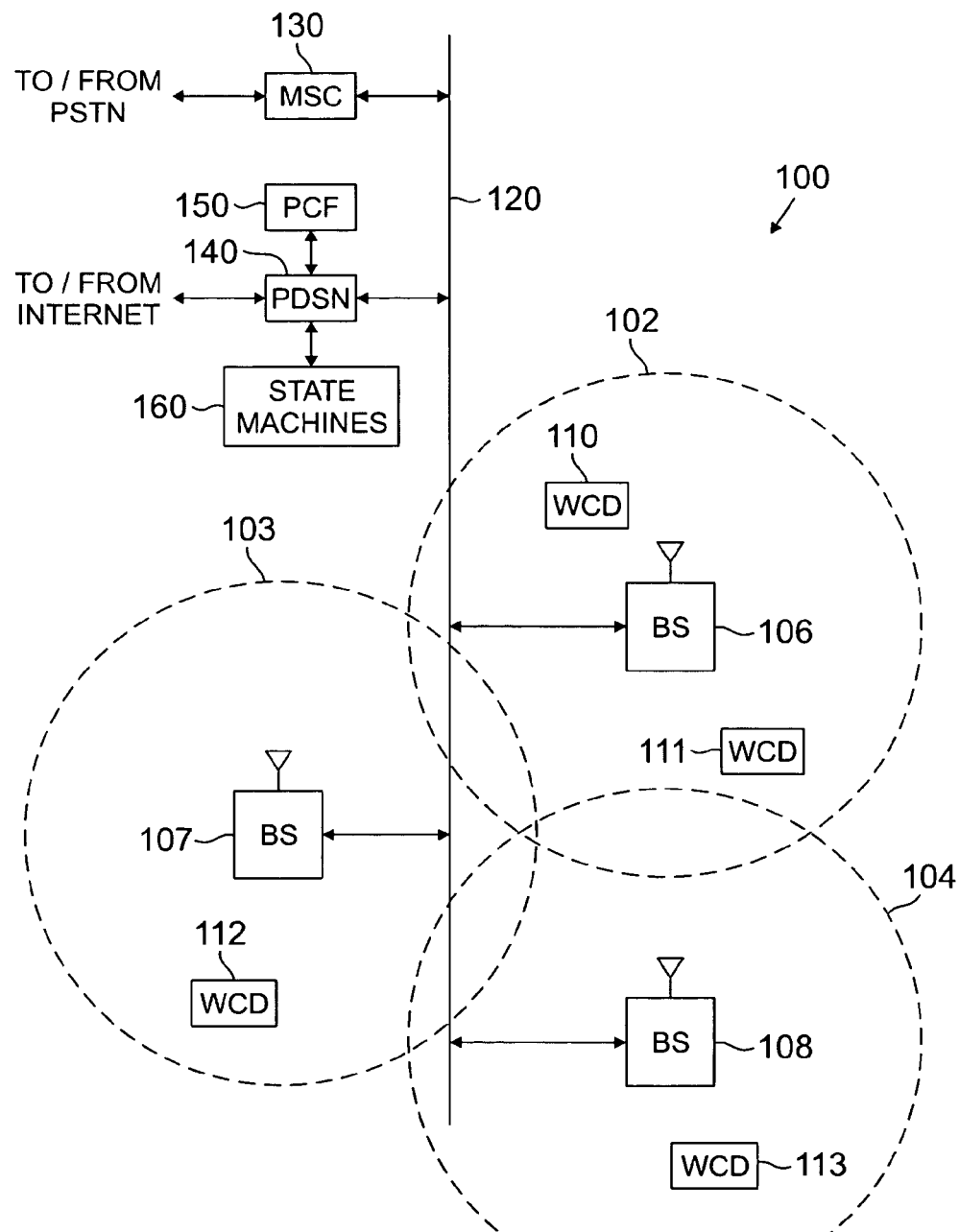
FIG. 1 is a block diagram illustrating a general overview of a wireless network that is operable to assign servers based on server status in accordance with one embodiment of the present invention.

FIG. 1 is a block diagram illustrating a general overview of a wireless network 100 that is operable to assign servers based on server status in accordance with one embodiment of the present invention. The wireless network 100 comprises a plurality of cell sites 102-104, each of the cell sites 102-104 comprising a base station (BS) 106-108. As used herein, "each" means every one of at least a subset of the identified items.

Each base station 106-108 is operable to communicate with a plurality of wireless communication devices (WCD) 110-113. According to one embodiment, the base stations 106-108 are operable to communicate with the wireless communication devices 110-113 over code division multiple access (CDMA) channels according to the IS-2000-C standard (i.e., Release C of CDMA2000). Each of the wireless communication devices 110-113 may comprise a mobile wireless device, such as a cell phone, a PCS handset, a personal digital assistant (PDA) handset, a portable computer, a telemetry device, or the like, or any other suitable device operable to communicate with one of the base stations 106-108 via wireless links, including a stationary wireless device.

Dotted lines show the approximate boundaries of the cell sites 102-104 in which the base stations 106-108 are located. The cell sites 102-104 are shown approximately circular for the purposes of illustration and explanation only. It will be understood that the cell sites 102-104 may have other irregular shapes, depending on the cell configuration selected and natural and man-made obstructions.

The cell sites 102-104 comprise a plurality of sectors (not shown), where a directional antenna coupled to the base station 106-108 may provide service for each sector. The embodiment of FIG. 1 illustrates the base station 106-108 in the center of the cell site 102-104. In an alternate embodiment, the directional antennas may be positioned in corners of the sectors or in any other suitable location. The system of the present invention is not limited to any particular cell site configuration.

In one embodiment of the present invention, each base station 106-108 comprises a base station controller and at least one base transceiver subsystem. The base station controllers are operable to manage wireless communications resources, including the base transceiver subsystems, for specified cells 102-104 within the wireless network 100. The base transceiver subsystems comprise the RF transceivers, antennas, and other electrical equipment located in each cell site 102-104. This equipment may include air conditioning units, heating units, electrical supplies, telephone line interfaces and RF transmitters and RF receivers. For the purpose of simplicity and clarity in explaining the operation of the present invention, the base transceiver subsystem in each of the cells 102, 103 and 104 and the base station controller associated with each base transceiver subsystem are collectively represented by base stations 106, 102 and 103, respectively.

The base stations 106-108 are operable to transfer voice and data signals between each other and the public switched telephone network (PSTN) (not shown) via communication line 120 and a mobile switching center (MSC) 130. The base stations 106-108 are also operable to transfer data signals, such as packet data, back and forth from the Internet (not shown) via communication line 120 and a packet data server node (PDSN) 140. The packet control function (PCF) unit 150 may be operable to control the flow of data packets between base stations 106-108 and the PDSN 140. The PCF unit 150 may be implemented as part of the PDSN 140, as part of the base stations 106-108, or as a stand-alone device that communicates with the PDSN 140, as shown in FIG. 1. Communication line 120 is also operable to establish connections for voice and data circuits between the MSC 130 and the base stations 106-108.

The communication line 120 may be any suitable connection means, including a T1 line, a T3 line, a fiber optic link, or any other type of data connection. The connections on line 120 may transmit analog voice signals or digital voice signals in pulse code modulated (PCM) format, Internet Protocol (IP) format, asynchronous transfer mode (ATM) format, or the like. According to an advantageous embodiment of the present invention, line 120 also provides an Internet Protocol (IP) connection that transfers data packets between the base stations 106-108 of the wireless network 100. Thus, line 120 may comprise a local area network that is operable to provide direct IP connections between base stations 106-108 without using the PDSN 140.

The MSC 130 comprises a switching device that is operable to provide services and coordination between the subscribers in the wireless network 100 and external networks, such as the PSTN or Internet. In some embodiments of the present invention, communications line 120 may be several different data links, where each data link couples one of the base stations 106-108 to the MSC 130.

In the embodiment of the wireless network 100 shown in FIG. 1, wireless communication device 110 and wireless communication device 111 are located in cell site 102 and are operable to communicate with base station 106. Wireless communication device 112 is located in cell site 103 and is operable to communicate with base station 107, and wireless communication device 113 is located in cell site 104 and is operable to communicate with base station 108.

The wireless network 100 also comprises a plurality of state machines 160 that are operable to communicate with the PDSN 140. As described in more detail below in connection with FIG. 2, the state machines 160 comprise call state control function (CSCF) state machines, including at least one proxy state machine, at least one interrogating state machine, and at least two serving state machines. Each of the state machines 160 may comprise a computer or other suitable device that is operable to perform the tasks associated with the state machine 160. According to one embodiment, the state machines 160 may comprise Session Initiation Protocol (SIP) proxy servers. The interrogating state machine is operable, in response to registration requests from wireless communication devices 110-113, to provide the assignment of serving state machines, or servers, based on server status.

Figure 2:
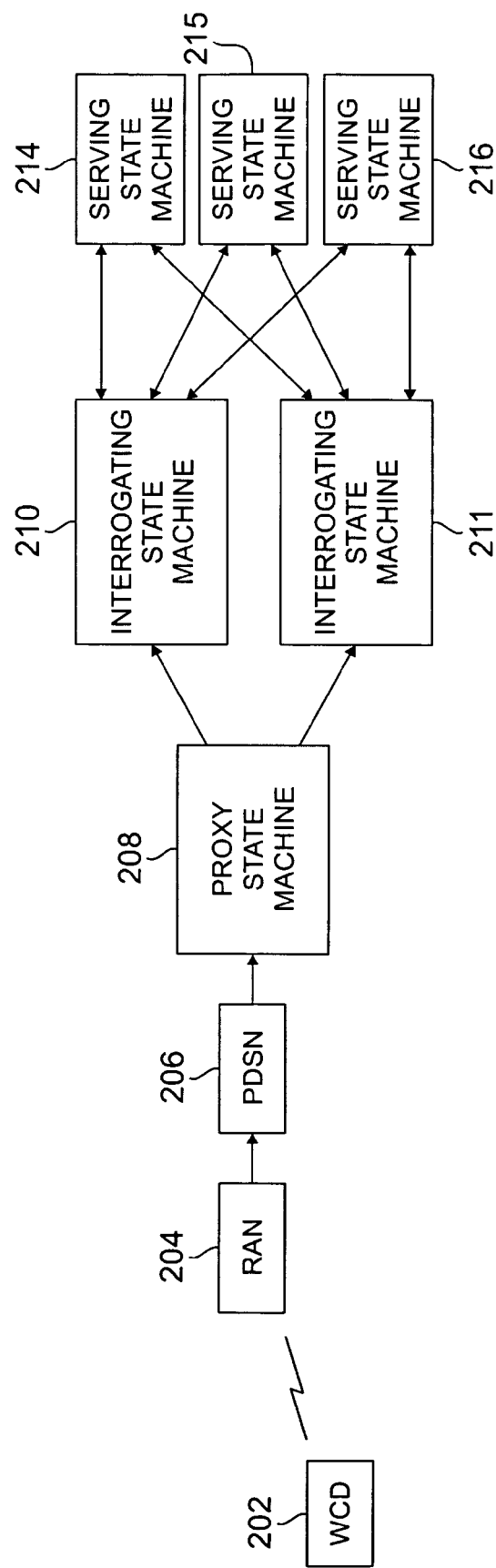
FIG. 2 is a block diagram illustrating selected portions of the wireless network of FIG. 1 that are operable to assign servers based on server status in accordance with one embodiment of the present invention.

FIG. 2 is a block diagram illustrating selected portions of the wireless network 100 that are operable to assign servers based on server status in accordance with one embodiment of the present invention. The illustrated embodiment comprises a wireless communication device 202 representing one of the wireless communication devices 110-113, a radio access network (RAN) 204 representing one of the base stations 106-108, and a packet data server node (PDSN) 206 representing the PDSN 140.

The selected portions of the wireless network 100 also comprise at least one proxy state machine 208, at least one interrogating state machine 210-211, and at least two serving state machines 214-216, collectively representing the state machines 160. Thus, although illustrated with one proxy state machine 208, two interrogating state machines 210-211, and three serving state machines 214-216, it will be understood that the wireless network 100 may comprise any suitable number of these state machines 208, 210-211 and 214-16 without departing from the scope of the present invention.

The proxy state machine 208 is operable to forward data, including registration requests from wireless communication devices 202, to an interrogating state machine 210-211. The interrogating state machines 210-211 are each operable to respond to registration requests by assigning one of the serving state machines 214-216 to host the registration for the requesting wireless communication device 202.

As described in more detail below in connection with FIG. 3, the interrogating state machines 210-211 are operable to assign one of the serving state machines 214-216 based on the server status of each of the serving state machines 214-216. The server status may comprise load, capability and/or other suitable status information associated with the serving state machines 214-216. Each serving state machine, or server, 214-216 is operable to provide the server status information associated with itself to the interrogating state machine 210-211 for use in making the assignments.

Figure 3:
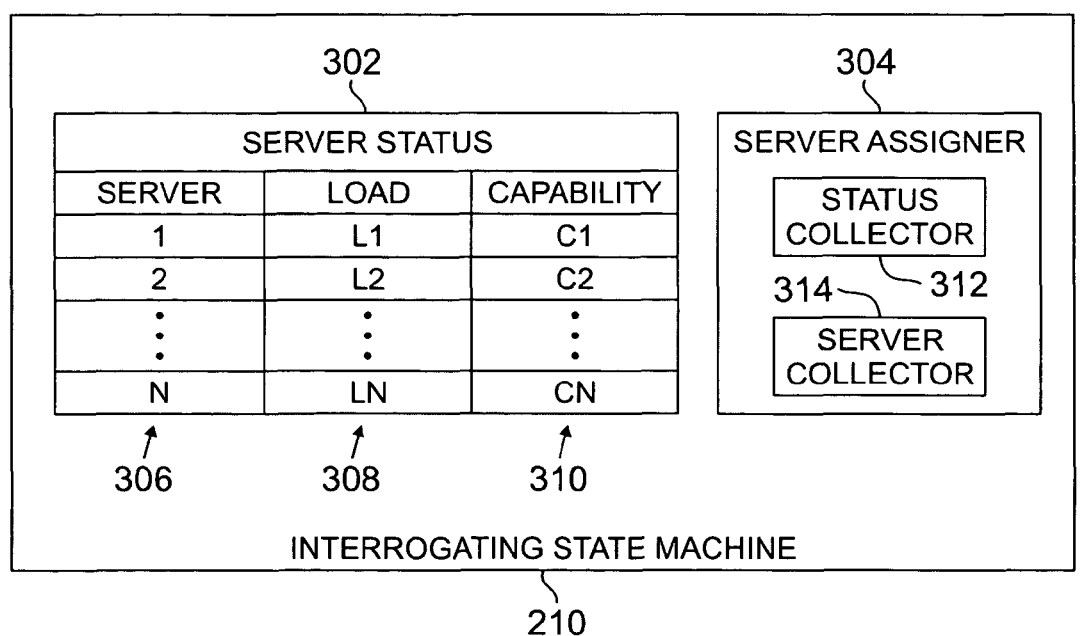
FIG. 3 is a block diagram illustrating the interrogating state machine of FIG. 2 in accordance with one embodiment of the present invention.

FIG. 3 is a block diagram illustrating one of the interrogating state machines 210 in accordance with one embodiment of the present invention. The interrogating state machine 210 comprises a server status store 302 and a server assigner 304.

Although illustrated as a table, it will be understood that the server status store 302 may comprise a database or any other suitable data store that is operable to store server status information for the serving state machines 214-216. According to the illustrated embodiment, the server status store 302 comprises a table with three columns 306, 308 and 310. A server column 306 is operable to identify the serving state machines 214-216 by number, name, address or other suitable identifier, and two server status information columns 308 and 310 are operable to provide server status information for the corresponding serving state machine 214-216 identified in the server column 306.

In the illustrated embodiment, the server status information columns 308 and 310 comprise a load information column 308 and a capability information column 310. However, it will be understood that the table may comprise any suitable number of server status information columns 308, 310, each of which may comprise any suitable server status information relevant to the ability of the serving state machines 214-216 to handle incoming registration requests without departing from the scope of the present invention.

Therefore, as illustrated, the server status store 302 comprises a server status, made up of the data stored in the server status information columns 308 and 310, for each of a plurality of serving state machines 214-216. In addition, the plurality of server statuses stored in the server status store 302 for each of these serving state machines 214-216 collectively forms a system status. Thus, for the illustrated embodiment, each row of the server status store 302 provides a server status for a serving state machine 214-216, while all the rows together provide a system status for the entire system of serving state machines 214-216.

The server assigner 304 is operable to collect server status information for the serving state machines 214-216, to store the server status information in the server status store 302, and to assign one of the serving state machines 214-216 to host a wireless communication device 202 in response to a registration request from the wireless communication device 202 based on the server status information stored in the server status store 302.

For one embodiment, the server assigner 304 comprises a status collector 312 and a server selector 314. The status collector 312 is operable to collect server status information from the serving state machines 214-216 and to store that information in the server status store 302. The server selector 314 is operable to access the server status store 302 in response to a registration request received from a wireless communication device 202 and to select one of the serving state machines 214-216 based on the server status information in the server status store 302. The server assigner 304 is operable to assign the serving state machine 214-216 that was selected based on the server status information to host a wireless communication device 202 that is requesting registration.

Either or both of the status collector 312 and the server selector 314 may comprise logic encoded in media. The logic comprises functional instructions for carrying out program tasks. The media comprises computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized.

Figure 4:
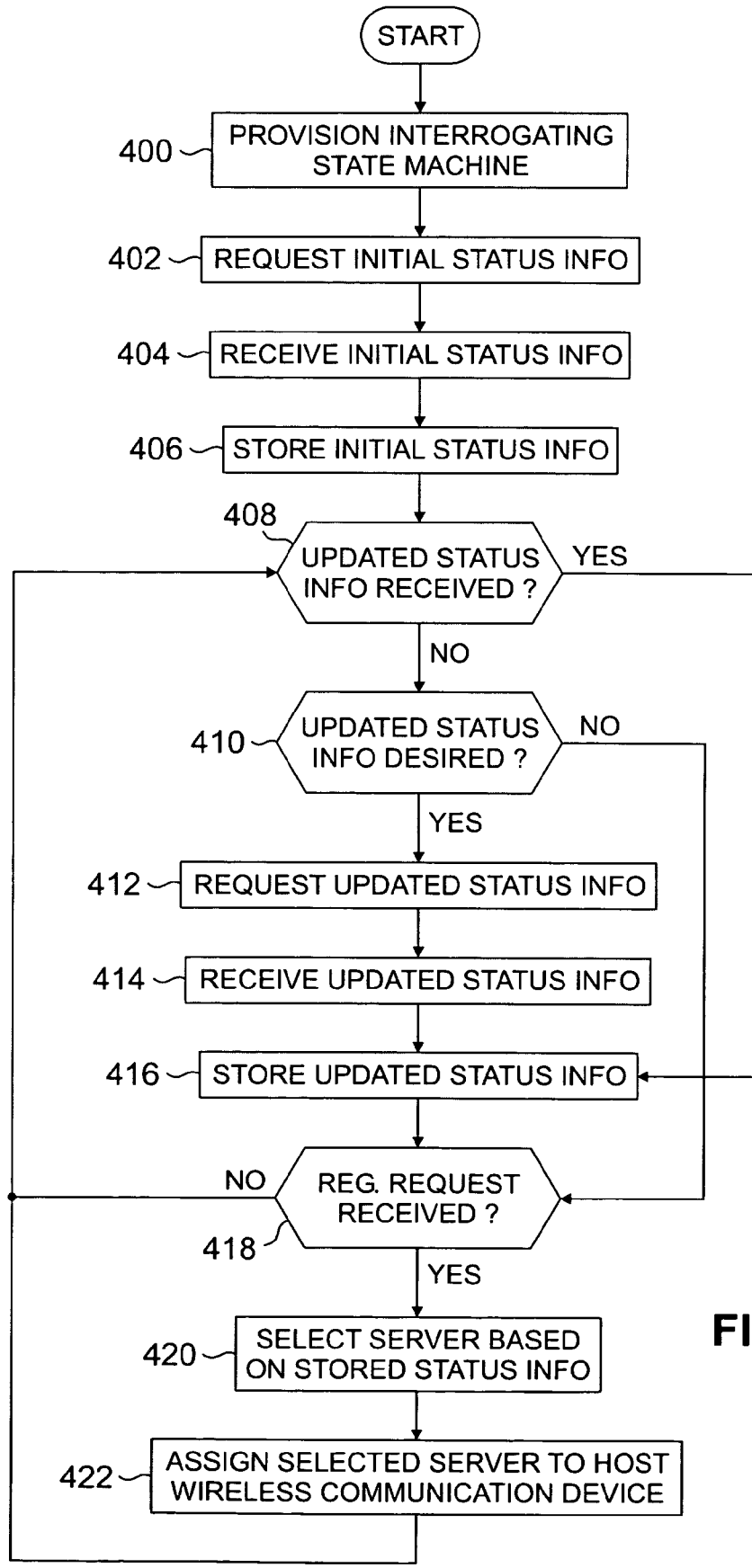
FIG. 4 is a flow diagram illustrating a method for assigning servers based on server status in the wireless network of FIG. 1 in accordance with one embodiment of the present invention.

FIG. 4 is a flow diagram illustrating a method for assigning servers 214-216 based on server status in the wireless network 100 in accordance with one embodiment of the present invention. The method begins at step 400 where an interrogating state machine, such as the interrogating state machine 210, is provisioned. For one embodiment, the interrogating state machine 210 is provisioned with the addresses of the serving state machines 214-216. For example, the addresses of the serving state machines 214-216 may be stored in the server column 306 of the server status store 302.

For another embodiment, the interrogating state machine 210 is provisioned with the names of the serving state machines 214-216. These names may be stored in the server column 306 of the server status store 302 and the interrogating state machine 210 may request a current address for a serving state machine 214-216 from a domain name server as needed, or upon provisioning with the names, the interrogating state machine 210 may request current addresses for the serving state machines 214-216 from a domain name server and store the current addresses in the server column 306 of the server status store. It will be understood that the interrogating state machine 210 may be otherwise suitably provisioned without departing from the scope of the present invention.

At step 402, the interrogating state machine 210 requests initial server status information from each of the serving state machines 214-216. As described above, this server status information may comprise load information, capability information and/or any other suitable information relevant to the ability of the serving state machines 214-216 to handle incoming registration requests. The load information comprises actual load information for the serving state machine 214-216 based on the activities of any previously registered wireless communication devices 202, as opposed to simply the number of registered wireless communication devices 202. The capability information comprises information regarding the load size that the serving state machine 214-216 is capable of supporting.

Along with the request for initial server status information, the interrogating state machine 210 may include trigger information for the serving state machines 214-216. This trigger information notifies the serving state machines 214-216 of which triggers are to prompt the serving state machines 214-216 to provide the interrogating state machine 210 with updated server status information. For example, the trigger information may comprise the load for the serving state machine 214-216 increasing by 5%, the capability of the serving state machine 214-216 changing or decreasing and/or any other suitable information relevant to the ability of the serving state machines 214-216 to host registrations for wireless communication devices 202.

At step 404, the interrogating state machine 210 receives initial server status information from each of the serving state machines 214-216. According to the embodiment described in connection with FIG. 3, the status collector 312 of the server assigner 304 collects the initial server status information received from the serving state machines 214-216.

It will be understood that the interrogating state machine 210 may set an initial timer when the initial server status information is requested. If any one or more of the serving state machines 214-216 fails to respond with initial server status information before the initial timer expires, the interrogating state machine 210 may request the initial server status information again. If the interrogating state machine 210 requests the initial server status information from the same serving state machine 214-216 a specified number of times without receiving the initial server status information in response, the interrogating state machine 210 may mark that serving state machine 214-216 as "out-of-service." In addition, a serving state machine 214-216 may notify the interrogating state machine 210 that it is not in service, and later provide server status information to the interrogating state machine 210 to notify the interrogating state machine 210 that it is back in service.

At step 406, the interrogating state machine 210 stores the initial server status information. For one embodiment, the status collector 312 of the server assigner 304 stores the initial server status information in the server status store 302.

At decisional step 408, the interrogating state machine 210 determines whether or not updated server status information has been received from any of the serving state machines 214-216. For one embodiment, the status collector 312 makes this determination. Updated server status information may be provided by one of the serving state machines 214-216 when a trigger, as defined by the trigger information described above, has been reached, when a predefined trigger has been reached, based on a set amount of time passing and/or based on any other suitable update criteria.

If the interrogating state machine 210 determines that updated server status information has not been received from any of the serving state machines 214-216 in decisional step 408, the method follows the No branch from decisional step 408 to decisional step 410.

At decisional step 410, the interrogating state machine 210 determines whether or not updated server status information is desired from any of the serving state machines 214-216. For one embodiment, the status collector 312 makes this determination.

For example, the interrogating state machine 210 may set an update timer after any previously received server status information is stored. If any one or more of the serving state machines 214-216 fails to provide updated server status information before the update timer expires, the interrogating state machine 210 may determine that updated server status information is desired.

If the interrogating state machine 210 determines that updated status information is desired from any of the serving state machines 214-216 in decisional step 410, the method follows the Yes branch from decisional step 410 to step 412. At step 412, the interrogating state machine 210 requests updated server status information from one or more of the serving state machines 214-216.

At step 414, the interrogating state machine 210 receives updated server status information from the one or more serving state machines 214-216. For one embodiment, the status collector 312 of the server assigner 304 collects the updated server status information received from the one or more serving state machines 214-216.

It will be understood that if the updated server status information is not received and the interrogating state machine 210 requests updated server status information from the same serving state machine 214-216 a specified number of times without receiving the updated server status information in response, the interrogating state machine 210 may mark that serving state machine 214-216 as "out-of-service."

Returning to decisional step 408, if the interrogating state machine 210 determines that updated server status information has been received from any of the serving state machines 214-216, the method follows the Yes branch from decisional step 408 to step 416. In addition, from step 414, the method continues to step 416.

At step 416, the interrogating state machine 210 stores the updated server status information in place of any earlier stored server status information, such as the initial server status information or any previously received updated server status information, for that serving state machine 214-216. In this way, current server status information and a current system status may be maintained in the server status store 302. As used herein, "current" refers to the most recently received server status and/or system status for serving state machines 214-216 that periodically provide updated server status information such that the current server statuses and, thus, the current system status comprise relatively fresh information. Thus, although the server status and the system status may vary, the information stored in the server status store 302 is kept current. For one embodiment, the status collector 312 of the server assigner 304 stores the updated server status information in the server status store 302.

Returning to decisional step 410, if the interrogating state machine 210 determines that updated status information is not desired from any of the serving state machines 214-216, the method follows the No branch from decisional step 410 to decisional step 418. In addition, from step 416, the method continues to decisional step 418.

At decisional step 418, the interrogating state machine 210 determines whether or not a registration request has been received from a wireless communication device 202. For one embodiment, the server selector 314 makes this determination. If a registration request has not been received, the method follows the No branch from decisional step 418 and returns to decisional step 408 for another determination as to whether or not updated status information has been received from any of the serving state machines 214-216.

However, if a registration request has been received from a wireless communication device 202, the method follows the Yes branch from decisional step 418 to step 420. At step 420, the interrogating state machine 210 selects a serving state machine, or server, 214-216 based on the stored server status information. For one embodiment, the server selector 314 selects the serving state machine 214-216 based on the information stored in the server status store 302.

At step 422, the interrogating state machine 210 assigns the selected serving state machine 214-216 to host the registration for the wireless communication device 202 from which the registration request was received, after which the method returns to decisional step 408, where another determination is made as to whether or not updated status information has been received from any of the serving state machines 214-216. For one embodiment, the server assigner 304 assigns the selected serving state machine 214-216 to host the registration.

Thus, in this way, the interrogating state machine 210 may assign one of the serving state machines 214-216 to host a registration for a wireless communication device 202 based on server status information for the serving state machines 214-216, thereby more evenly distributing the registrations based on actual status information, such as actual load, capability and/or the like.

Although the present invention has been described with several embodiments, various changes and modifications may be suggested to one skilled in the art. It is intended that the present invention encompass such changes and modifications as fall within the scope of the appended claims.

What is claimed is:

1. For use in a wireless network comprising a plurality of wireless communication devices, an interrogating state machine comprising:
   a server status store configured to store current server status information for each of a plurality of servers, the current server status information for each server comprising load information, capability information, and an in-service/out-of-service status; and
   a server assigner configured to collect server status information comprising information associated with whether the servers are in-service or out-of-service from the servers, the server status information collected by at least one of receiving a message indicating an in-service/out-of-service status of each server, and transmitting an interrogation message to each server for a specified number of times in which no response to the interrogation message is received, to provide triggers to the servers, to store the server status information in the server status store as current server status information, and to assign one of the servers to host one of the wireless communication devices based on the in service/out-of-service status of each server,
   wherein the triggers provided to the servers comprise information related to instructions on what time-independent conditions under which the servers are to provide the interrogating state machine with updated server status information.

2. The interrogating state machine of claim 1, wherein the current server status information stored in the server status store collectively forms a current system status, the server assigner configured to assign one of the servers to host one of the wireless communication devices based on the current system status.

3. The interrogating state machine of claim 1, wherein the server assigner is configured to receive a registration request from the one of the wireless communication devices and to assign one of the servers to host the wireless communication device based on receiving the registration request.

4. The interrogating state machine of claim 1, wherein each of the servers comprises a serving call state control function (S-CSCF), the S-CSCF configured to enable provision of Internet Protocol Multimedia Domain (IPMMD) services for the wireless communication devices that the S-CSCF is assigned to host.

5. The interrogating state machine of claim 1, wherein the server status store comprises a table, the table comprising a server column configured to identify the servers and a first server status information column configured to provide first server status information for the corresponding server identified in the server column.

6. The interrogating state machine of claim 5, wherein the table further comprises a second server status information column configured to provide second server status information for the corresponding server identified in the server column, the first server status information comprising load information and the second server status information comprising capability information.

7. The interrogating state machine of claim 1, wherein the server assigner comprises:
   a status collector configured to collect the server status information from the servers and to store the server status information in the server status store as current server status information; and
   a server selector configured to access the server status store based on receiving a registration request from the one of the wireless communication devices and to select one of the servers based on the current server status information in the server status store, the server assigner configured to assign the server selected by the server selector to host the wireless communication device.

8. A wireless network, comprising:
   a plurality of servers, each server having a varying server status, the server status for each server comprising load information, capability information, and an in-service/out-of-service status, the server statuses of the servers collectively forming a varying system status; and
   at least one interrogating state machine configured to receive a registration request from one of a plurality of wireless communication devices and, based on the registration request, to assign one of the servers to host the wireless communication device based on a current system status, the current system status based on the in-service/out-of-service status of each server,
   wherein the current system status is configured to be dynamically updated by information received from at least one of the servers,
   wherein the at least one of the servers is configured to provide the information to the at least one interrogating state machine based upon at least one trigger provided to the plurality of servers by the at least one interrogating state machine,
   wherein the trigger defines time-independent conditions under which the plurality of servers provide information to the at least one interrogating state machine, and
   wherein the in-service/out-of-server status is configured to be dynamically updated by at least one of receiving a message indicating an in-service/out-of-service status of the at least one server, and transmitting an interrogation message to the at least one server for a specified number of times in which no response to the interrogation message is received.

9. The wireless network of claim 8, wherein the interrogating state machine comprises:

a server status store configured to store current server statuses for each of the servers, the current server statuses based on the varying server statuses; and a server assigner configured to collect the server statuses from the servers, to store the server statuses in the server status store, and to assign one of the servers to host the wireless communication device based on the current system status.

10. The wireless network of claim 9, wherein the server assigner is configured to receive the registration request from the wireless communication device.

11. The wireless network of claim 9, wherein each of the servers comprises a serving call state control function (S-CSCF), the S-CSCF configured to enable provision of Internet Protocol Multimedia Domain (IPMMD) services for the wireless communication devices that the S-CSCF is assigned to host.

12. The wireless network of claim 9, wherein the server status store comprises a table, the table comprising a server column configured to identify the servers and a first server status information column configured to provide first server status information for the corresponding server identified in the server column.

13. The wireless network of claim 12, wherein the table further comprises a second server status information column configured to provide second server status information for the corresponding server identified in the server column, the first server status information comprising load information and the second server status information comprising capability information.

14. The wireless network of claim 9, wherein the server assigner comprises:

a status collector configured to collect the server statuses from the servers and to store the server statuses in the server status store; and a server selector configured to access the server status store based on receiving a registration request from the wireless communication device and to select one of the servers based on the server statuses in the server status store, the server assigner configured to assign the server selected by the server selector to host the wireless communication device.

15. The wireless network of claim 8, further comprising a plurality of interrogating state machines, each interrogating state machine configured to receive a registration request from one of the wireless communication devices and, based on the registration request, to assign one of the servers to host the wireless communication device based on the current system status.

16. A method for assigning one of a plurality of servers to host a registration for a wireless communication device, the method comprising:

receiving a registration request from the wireless communication device; and assigning one of the servers to host the wireless communication device based on a current server status for each of the servers, the current server status for each server comprising load information, capability information for, and an in-service/out-of-service status, wherein the assignment of one of the plurality of servers is performed using an interrogatory state machine, wherein the plurality of servers provides the information to the at least one interrogating state machine based upon time-independent conditions defined by at least one trigger provided to the servers by the at least one interrogating state machine, and wherein the in-service/out-of-server status is configured to be dynamically updated by at least one of receiving a message indicating an in-service/out-of-service status of the each server, and transmitting an interrogation message to the each server for a specified number of times in which no response to the interrogation message is received.

17. The method of claim 16, further comprising:
requesting a server status from each of the servers;
receiving server statuses from at least a portion of the servers; and
storing the server statuses as current server statuses.

18. The method of claim 17, further comprising:
accessing the stored current server statuses based on receiving the registration request;
selecting one of the servers based on the stored current server statuses; and
assigning one of the servers to host the wireless communication device comprising assigning the selected server to host the wireless communication device.

19. The method of claim 17, further comprising:
receiving updated server statuses from at least a portion of the servers; and
storing the updated server statuses in place of the previously stored server statuses as current server statuses.

20. The method of claim 19, further comprising requesting updated server statuses from at least a portion of the servers.

* * * * *